United States Patent [19]

Sumita et al.

[11] Patent Number: 5,213,736
[45] Date of Patent: May 25, 1993

[54] PROCESS FOR MAKING AN ELECTROCONDUCTIVE POLYMER COMPOSITION

[75] Inventors: Masao Sumita, Tokyo; Yohsuke Hirao; Hirokazu Yamada, both of Oita, all of Japan

[73] Assignee: Showa Denko K.K., Tokyo, Japan

[21] Appl. No.: 755,224

[22] Filed: Sep. 5, 1991

Related U.S. Application Data

[62] Division of Ser. No. 338,027, Apr. 14, 1989, abandoned.

[30] Foreign Application Priority Data

Apr. 15, 1988 [JP] Japan .................................. 63-91692

[51] Int. Cl.$^5$ .......................... B29B 7/02; B29C 39/02
[52] U.S. Cl. .................................... 264/104; 252/500; 264/105
[58] Field of Search ................. 264/104, 105; 252/500

[56] References Cited

U.S. PATENT DOCUMENTS

| | | | |
|---|---|---|---|
| 3,846,223 | 11/1974 | Lederman et al. | 264/104 |
| 4,596,669 | 6/1986 | Kleiner | 264/104 |
| 4,675,143 | 6/1987 | Wakita et al. | 264/104 |
| 4,719,039 | 1/1988 | Leonardi | 264/105 |
| 4,775,500 | 10/1988 | Funakoshi et al. | 264/105 |
| 4,788,104 | 11/1988 | Adriaensen et al. | 264/104 |
| 4,839,114 | 6/1989 | Delphin et al. | 264/105 |

FOREIGN PATENT DOCUMENTS

| | | |
|---|---|---|
| 0181587 | 5/1986 | European Pat. Off. |
| 61-149329 | 7/1986 | Japan .................................. 264/104 |

OTHER PUBLICATIONS

European Search Report.

*Primary Examiner*—Jan H. Silbaugh
*Assistant Examiner*—Brian J. Eastley
*Attorney, Agent, or Firm*—Sughrue, Mion, Zinn, Macpeak & Seas

[57] ABSTRACT

A process for making an electroconductive polymer composition containing a matrix composed of a mixture of at least two polymers which are incompatible with each other, and an electroconductivity-imparting filler distributed predominantly in the polymer having a higher affinity with the filler. The plastic composition exhibits a higher conductivity than that obtained by blending each of the polymers as the matrix with the same filler.

5 Claims, 1 Drawing Sheet

PROCESS FOR MAKING AN ELECTROCONDUCTIVE POLYMER COMPOSITION

This is a divisional of application Ser. No. 07/338,027 filed Apr. 14, 1989, now abandoned.

BACKGROUND OF THE INVENTION (1) Field of the Invention

This invention relates to an electroconductive polymer composition. More particularly, it relates to an electroconductive polymer composition for preventing electromagnetic interference (hereinafter referred to as "EMI") and an accumulation of static electricity.

(2) Description of the Related Art

With the development of electronic appliances such as a computer, the prevention of EMI and an accumulation of static electricity have become important, and various processes therefor have been proposed. Typical examples of known EMI prevention processes are a surface-treating process in which only the surface of a non-electroconductive material is treated, for example, coated with an electroconductive substance; an internal treating process in which an electroconductive filler is dispersed in or laminated on a non-electroconductive material; and a metal process in which a metal having a high electroconductivity is used.

Note, an electroconductive polymer composition comprising a thermoplastic resin and an electroconductive filler dispersed in the resin is known.

Of these conventional techniques, many reports have been made on an electroconductive polymer composition comprising an electroconductive filler dispersed in a polymer.

In the usual process for the preparation of an electroconductive polymer article, a filler is first mixed and kneaded with a matrix resin and the mixture is shaped by injection molding or the like. A banbury mixer, a mixing roll, a twin-screw extruder or the like is used for the kneading.

If the amount of the filler incorporated is increased, to improve the electroconductivity, the melt fluidity is reduced and the molding and processing become difficult. Furthermore, even if molding is possible, because of a short shot or the like, a satisfactory shaped article cannot be obtained, and often the resulting shaped article has poor mechanical properties, such as a poor impact strength.

The incorporation of excessive amounts of some fillers is not advantageous from the economical viewpoint.

The scatter of the electroconductivity of products is large, due to the processing conditions, and in practical operation, it is often found that the electroconductivity of the products differs. Moreover, in some cases, even if a good electroconductivity is obtained just after the preparation, the electroconductivity is gradually lost with the lapse of time.

The present inventors collectively reported on the series of investigations they made, in the "Journal of the Adhesion Society of Japan, Vol. 23, No. 3, pages 103-111 (1987)", and in this report showed that the interfacial affinity between the polymer and the filler is an important factor having an influence on the manifestation of the electroconductivity, the behavior of the electroconductivity in various resin matrices can be elucidated based on the difference in the dispersion state of the filler, and the volume fraction (hereinafter referred to as "Vf") of the filler producing the electroconductivity by a formation of conducting paths differs greatly according to the kind of resin matrix. Furthermore, by changing the dispersion state of fine particles of carbon black by utilizing a thermal relaxation of polymers, it was found that the electroconductivity was improved by an aggregation of the filler.

When preparing an electroconductive polymer composition by dispersing an electroconductive filler into a polymer, if an attempt is made to improve the electroconductivity by increasing the amount of the electroconductive filler, a deterioration of properties other than the electroconductivity, such as the processability and mechanical properties, and an increase of the costs, cannot be avoided.

SUMMARY OF THE INVENTION

In view of the above, the primary object of the present invention is to provide an electroconductive polymer composition, which contains an electroconductive filler in substantially the same amount as that customarily adopted but exhibits an electroconductivity superior to the customarily obtained electroconductivity or an electroconductive polymer composition, and which contains an electroconductive filler in an amount smaller than that customarily adopted but exhibits an electroconductivity comparable or superior to the customarily obtained electroconductivity.

During investigations by the present inventors into particle-dispersed polymeric materials, it was found that the Vf and dispersion state of the filler have a great influence on the physical properties of the obtained composite material. Vf is a factor having a great influence on the electroconductivity, but as pointed out hereinbefore, an increase of Vf is industrially disadvantageous. Accordingly, the present inventors attempted to solve the above-mentioned problem mainly by controlling the dispersion state, and not by controlling the amount of the filler, and thus created the present invention.

In accordance with the present invention, there is provided an electroconductive polymer composition comprising a matrix composed of a mixture of at least two polymers which are incompatible with each other, and an electroconductivity-imparting filler distributed predominantly in the polymer having a higher affinity with the filler, wherein said mixture of polymers has a composition such that the extraction ratio of the polymer having a higher affinity with the filler is at least 0.3. The extraction ratio is expressed by the following formula:

$$Extraction\ ratio = A/B$$

wherein A is the amount of the polymer having a higher affinity with the filler, which has been extracted from the polymer mixture by a solvent capable of dissolving ony the polymer having a higher affinity with the filler, and B is the amount of the polymer having a higher affinity with the filler in the polymer mixture. By producing the mixing state in which the phase of the polymer having the filler predominantly distributed therein is continuous or substantially continuous, the electroconductivity is manifested at a high efficiency and a product having a reduced scatter of the electroconductivity can be obtained.

DESCRIPTION OF THE PREFERRED EMBODIMENTS

Figure 1:
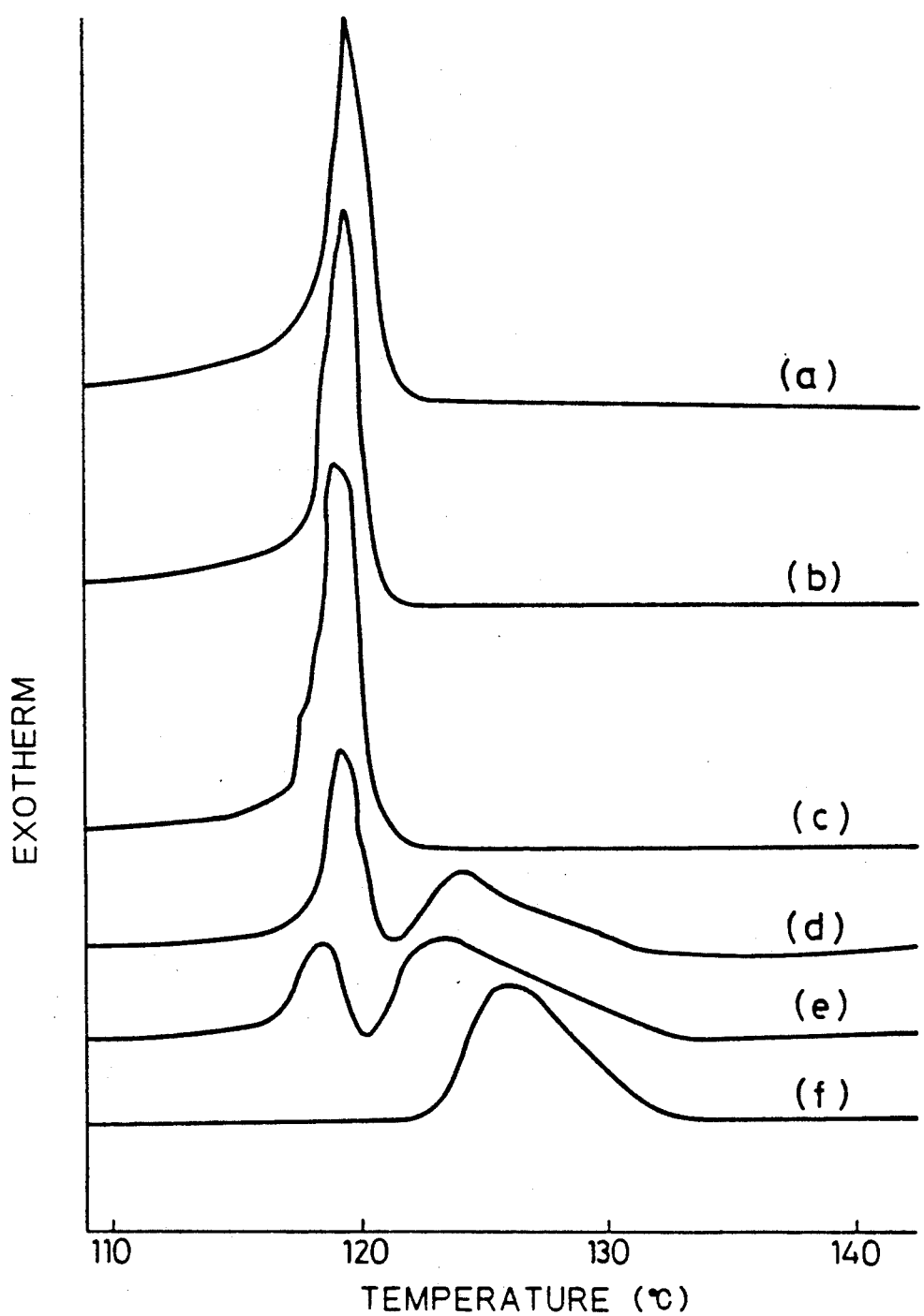
FIG. 1 shows exotherm curves obtained by differential scanning calorimetry with regard to high density polyethylene/polypropylene mixtures.

All polymers customarily used can be used as the polymer in the present invention. For example, a matrix can be formed by combining two polymers selected from polyolefins such as polyethylene and polypropylene, polyamides such as nylon 6 and nylon 66, polyesters such as polyethylene terephthalate and polybutylene terephthalate, acrylic resins such as polymethyl methacrylate, styrene resins such as polystyrene and poly-α-methylstyrene, polycarbonates, polyketones, polyvinyl chloride, saponified ethylene/vinyl acetate copolymers, ethylene/vinyl alcohol copolymers, polyvinyl acetate polyoxymethylene, polyphenylsulfone, and polyphenylene oxide. Note, the two combined polymers must be incompatible with each other. If the two polymers are completely compatible with each other, the mixture forms substantially one phase, and therefore, the effect of distributing the filler predominantly in one phase and substantially increasing the Vf in this phase, as intended by the present invention, cannot be obtained. Accordingly, in the combination of two polymers which are inherently incompatible with each other, if the mixture appears to be one phase, the intended effect can not be obtained.

Any method of analyzing polymers can be used for determining an appropriate mixing ratio, for example, the differential scanning calorimetric measurement (hereinafter referred to as "DSC") can be utilized.

In the case of a combination of crystalline polymers, if the mixing ratio is such that crystallization peaks attributed to the respective polymers occur, a product having a high electroconductivity and a good electroconductivity stability can be obtained. For example, in the case of a combination of polyethylene/polypropylene, if the polyethylene/polypropylene ratio is 60/40 or higher, it becomes difficult to clearly discriminate two peaks, and the effect intended by the present invention is not obtained in some samples or the variability of the product characteristics is increased. In the case of a combination of amorphous polymers, second-order transitions can be adopted instead of the crystallization peaks, for determining the mixing ratio. These second-order transitions can be detected as stepwise signals in DSC, but if the detection is difficult, peaks observed at the dynamic viscoelasticity measurement can be adopted. If the change of the peak shift as observed by DSC or the dynamic viscoelasticity measurement where the electroconductive filler is incorporated in a mixture of polymers is larger than the change of the peak shift as observed where the filler is incorporated in each of the polymers, then the filler is predominantly distributed in the polymer having a higher affinity with the filler, and thus the electroconductivity-imparting effect is more prominently manifested.

Where kneading is carried out, aggregation is more remarkably advanced and, therefore, the effect becomes more prominent than where melting and solidification are carried out after dry blending.

The electroconductivity of the product is determined by various factors, and to ensure that the effect is manifested, the mixing state must be such that the filler-aggregated phase is completely continuous, or even if not completely continuous, two adjacent parts of the filler-aggregated phase are separated by a very thin part of the other polymer phase having a lower filler concentration, to an extent such that electroconductivity is manifested, where a good electroconductivity is manifested at a high efficiency and a stable product having a small scatter of the electroconductivity can be obtained.

The method of selectively extracting the filler-aggregated phase is preferably adopted as the method for evaluating the mixing state. If the ratio (A/B) of the polymer having a higher affinity with the filler, which has been extracted from the polymer mixture by a solvent capable of dissolving only the polymer having a higher affinity with the filler, to the amount (B) of the polymer having a higher affinity with the filler in the polymer mixture, is at least 0.3, the electroconductivity-imparting effect is stably obtained in the mixed matrix. The larger the value of this ratio, the higher the continuity, and the smaller the value of this ratio, the larger the proportion of the discontinuous part included in the non-aggregated phase. Theoretically speaking, even in the case of a smaller value, electroconductivity is manifested if a conducting path is formed, but practically, if the value of the above-mentioned ratio is below the above range, the degree of formation of conducting paths is low and the scatter of the electroconductivity in the product is large.

The filler to be used in the present invention will now be described.

Since the filler is used for imparting electroconductivity to a non-electroconductive plastic material, obviously the filler must be electroconductive. The filler is preferably a carbonaceous or metallic filler, or a filler, the surface of which is coated with carbon or metal. Further, the filler is in the form of powder, flakes or short fibers.

Preferably the absolute size of the filler is as small as possible, because a fine filler is readily aggregated due to the thermal motion of the molecule chain of the polymer, and the electroconductivity-imparting effect is more easily manifested. Accordingly, preferably carbon black or an ultrafine fiber having an average diameter not larger than 1 $\mu$m, such as a vapor grown carbon fiber, or a potassium titanate whisker or SiC whisker which is subjected to the electroconductive treatment, namely, surface-coated with metal, is used. A vapor grown carbon fiber, for example, a fiber obtained by introducing a solution of a hydrocarbon and an organic transition metal compound in an atmosphere maintained at a high temperature such as 900° to 1,300° C. by using hydrogen as a carrier gas and having a fiber diameter of 0.1 to 1.0 $\mu$m, is apt to aggregate, and if this carbon fiber is used, the electroconductivity-imparting effect is prominently manifested, as apparent from the examples given hereinafter. Even if various carbon fibers or metal fibers customarily used as electroconductive fillers are used, composite products having a higher electroconductivity than that of a conventional product obtained by using one polymer as the matrix can be obtained.

The amount of the electroconductive filler is preferably from 3 to 50% by weight, more preferably 5 to 30% by weight, based on the electroconductive polymer composition. If the amount of the filler is too large the melt fluidity is reduced and molding and processing become difficult. Furthermore, even if molding is possible, because of a short shot or the like, a satisfactory shaped article cannot be obtained, and often the resulting shaped article has poor mechanical properties, such as a poor impact strength.

The invention will be described by the following examples.

EXAMPLES 1 THROUGH 12

Examples 1 through 12 were carried out under the conditions shown in Tables 1-1 and 1-2.

The kneading method, the materials used, and the methods of measuring physical properties were as described below.

Kneading Method

When using a mixing roller or a laboratory mixer, only the resins were first blended and kneaded, and the filler was added to the kneaded mixture. Then, kneading was conducted for 10 minutes from the point of completion of the addition.

Molding Method

The kneaded sample was set in a predetermined mold, and the sample was melted and deaerated, pressed for 1 minute after deaeration, and then cooled to obtain a molded sample.

Matrix

HDPE: high-density polyethylene
PP: polypropylene
PMMA: polymethyl metacrylate
PS: polystyrene
PA66: polyhexamethylene adipamide

Filler

VGCF: ultrafine fiber obtained by introducing a solution of a hydrocarbon and an organic transition metal compound in an atmosphere at 1,200° C. by using hydrogen as a carrier gas, which had a fiber diameter of 0.1 to 1.0 μm (average fiber diameter was 0.3 μm)

Potassium Titanate Whisker

Dentall BK-100 (supplied Otsuka Chemical) subjected to the electroconductive treatment, which had a fiber diameter of 0.2 to 0.5 μm and a fiber length of 10 to 20 μm.

Method of Measurement of Specific Electric Resistance

In Examples 1 through 4 and 7 through 12, both surfaces of a sample having a thickness of about 0.5 mm were coated with a silver paste, and after drying, the specific resistance in the thickness direction was measured. In the case of a sample having a low electroconductivity, the measurement was carried out by using a vibrating reed electrometer (Model TR84M supplied by Takeda Riken), and in the case of a sample having a high electroconductivity, the measurement was carried out by using a Toa Digital Meter Model DMM-120A.

In Examples 5, 6 and 12, the measurement was carried out by the four-terminal method using a Loresta supplied by Mitsubishi Petrochemical.

Judgement of Filler-Predominantly-Distributed Phase

The filler-predominantly-distributed phase was checked by observation under an SEM (scanning electron microscope) or TEM (transmission electron microscope).

Extraction

A sample having a thickness of about 0.5 mm was extracted by using a Soxhlet extractor.

DSC

The measurement was carried out by using Instruments 910 DSC supplied by du Pont.

Dynamic Viscoelasticity

The measurement was carried out by using a rheolograph supplied by Toyo Seiki.

The results of the measurement of the specific electric resistance are shown in Table 2.

In each of the polymer combinations, an effect of drastically reducing the specific electric resistance was obtained by blending.

When only the filler-predominantly-distributed phase confirmed by the SEM or TEM was extracted, it was found that, if the extraction ratio was at least 0.3, the effect was obtained by blending (see Table 3).

DSC

The crystallization of samples molded in the same manner as described in Example 2, except that the filler was not added, was examined by DSC while the samples were cooled at a rate of 0.5° C./min.

More specifically, the temperature of each sample was rapidly elevated from room temperature to 220° C. annealing was conducted for 2 minutes, and the sample was cooled to 160° C. at a rate of 10° C./min and then cooled at a rate of 0.5° C./min. The measurement was conducted during this cooling process. The measurement results are shown in FIG. 1, wherein curves (a), (b), (c), (d), (e) and (f) correspond to the compositions of HDPE/PP=100/0, 80/20, 60/40, 40/60, 20/80, and 0/100, respectively.

When the data in Table 2 is compared with FIG. 1, it is seen that, in a composition where crystallization peaks attributed to two polymers are clearly observed an effect of reducing the specific electric resistance by blending is manifested.

Measurement of Dynamic Viscoelasticity

In Example 7, the difference of the Tg temperature (Tg shift) between samples having different polymer compositions and comparative samples different from the samples in that the filler was not incorporated, was measured (see Table 4).

The measurement was carried out at a frequency of 10 Hz and a temperature-elevating rate of 3° C./min within a temperature range of from room temperature to 110° C.

When Table 4 is compared with Table 1, it is seen that the effect of reducing the specific electric resistance by blending increases in proportion to the Tg shift of PMMA of the filler-predominantly-distributed phase.

TABLE 1

| | Matrix | Filler | Amount of filler (phr) | Kneading apparatus | Kneading temperature (°C) | Molding apparatus | Molding temperature (°C)[12] |
|---|---|---|---|---|---|---|---|
| Example 1 | HDPE[1]/PP[2] | Carbon black[8] | 15 | Mixing roller | 180–185 | Press | 200 |
| Example 2 | HDPE[3]/PP[4] | " | 10 | " | 180–185 | " | 200 |
| Example 3 | " | VGCF[9] | 10 | " | 180–185 | " | 200 |
| Example 4 | " | Potassium titanate whisker[10] | 10 | " | 180–185 | " | 200 |
| Example 5 | HDPE[5]/PP[6] | VGCF[9] | 25 | Labo plasto mill[11] | 230 | " | 180 |
| Example 6 | HDPE[7]/PP[6] | " | 25 | Labo plasto mill[11] | 230 | " | 180 |
| Example 7 | PMMA[13]/PP[4] | Carbon black[8] | 10 | Mixing roller | 180–185 | Press | 185 |
| Example 8 | " | VGCF[9] | 10 | " | 180–185 | " | 185 |
| Example 9 | " | Potassium titanate whisker[10] | 10 | " | 180–185 | " | 185 |
| Example 10 | PMMA[13]/PS[14] | Carbon black[8] | 10 | " | 180–185 | " | 185 |
| Example 11 | " | VGCF[9] | 10 | " | 180–185 | " | 185 |
| Example 12 | PA66[15]/PP[16] | " | 25 | " | 230 | " | 200 |

Note
[1]High-density polyethylene supplied by Mitsubishi Petrochemical.
[2]Polypropylene supplied by Mitsubishi Petrochemical.
[3]High-density polyethylene, Sholex S5008 supplied by Showa Denko, MI = 0.65.
[4]Polypropylene, Sho-allomer FA110 supplied by Showa Denko, MFI = 1.2.
[5]High-density polyethylene, Sholex F6200V supplied by Showa Denko, MI = 20.
[6]Polypropylene, Sho-allomer MA510 supplied Showa Denko, MFI = 12.
[7]High-density polyethylene, Sholex 5012 M supplied by Showa Denko, MI = 1.2.
[8]Carbon black, Seast 300 supplied by Tokai Carbon.
[9]VGCF, vapor grown carbon fiber.
[10]Dentall BK-100 supplied by Otsuka Chemical.
[11]Supplied by Toyo Boldwin.
[12]At the indicated temperatures, each molten sample was deaerated and then maintained under a pressure for one minute.
[13]Polymethyl methacrylate, MF supplied by Mitsubishi Rayon.
[14]Polystyrene supplied by Yoneyama Chemical, MW = 150,000–170,000.
[15]Polyhexamethylene adipamide, Technyl A216 supplied by Showa Denko.

TABLE 2

Specific Electric Resistance

Specific electric resistance ($\Omega \cdot cm^{-1}$)

| | | | |
|---|---|---|---|
| Example 1 | HDPE 100% $10^{17}$ | HDPE/PP = 20/80 $10^5$ | PP 100% $10^{18}$ |
| Example 2 | HDPE 100% $10^{18}$ | HDPE/PP 20/80 40/60 60/40 80/20 $10^7$ $10^9$ $10^{18}$ $10^{18}$ | PP 100% $10^{18}$ |
| Example 3 | HDPE 100% $10^{18}$ | HDPE/PP = 20/80 $10^4$ | PP 100% $10^{18}$ |
| Example 4 | HDPE 100% $10^{18}$ | HDPE/PP = 20/80 $5 \times 10^6$ | PP 100% $10^{18}$ |
| Example 5 | HDPE 100% $4 \times 10^0$ | HDPE/PP = 40/60 $7 \times 10^{-1}$ | PP 100% $2 \times 10^1$ |
| Example 6 | HDPE 100% $3 \times 10^1$ | HDPE/PP = 40/60 $10^0$ | PP 100% $2 \times 10^1$ |
| Example 7 | PMMA 100% $10^{18}$ | PMMA/PP 20/80 40/60 60/40 $2 \times 10^6$ $10^5$ $10^8$ | PP 100% $10^{18}$ |
| Example 8 | PMMA 100% $10^{18}$ | PMMA/PP 20/80 40/60 60/40 $5 \times 10^4$ $2 \times 10^3$ $7 \times 10^5$ | PP 100% $10^{18}$ |
| Example 9 | PMMA 100% $10^{18}$ | PMMA/PP 20/80 40/60 60/40 $7 \times 10^6$ $5 \times 10^5$ $10^8$ | PP 100% $10^{18}$ |
| Example 10 | PMMA 100% $10^{18}$ | PMMA/PS = 60/40 $10^5$ | PS 100% $5 \times 10^{16}$ |
| Example 11 | PMMA 100% $10^{18}$ | PMMA/PS = 60/40 $8 \times 10^3$ | PS 100% $10^{16}$ |
| Example 12 | PA66 100% $10^3$ | PA66/PP = 40/60 $2 \times 10^0$ | PP 100% $2 \times 10^1$ |

TABLE 3

Extraction Ratio of Filler-Predominantly-Distributed Phase

| | Filler-Predominantly Distributed Phase | Solvent | Polymer composition ratio | Extraction Ratio of Filler-Predominantly Distributed Polymer |
|---|---|---|---|---|
| Example 7 | PMMA | Chloroform | PMMA/PP = 20/80 | 0.54 |
| | | | PMMA/PP = 40/60 | 0.92 |
| | | | PMMA/PP = 60/40 | 0.92 |
| Example 8 | PMMA | Chloroform | PMMA/PP = 20/80 | 0.35 |
| | | | PMMA/PP = 40/60 | 0.85 |
| | | | PMMA/PP = 60/40 | 0.90 |
| Example 9 | PMMA | Chloroform | PMMA/PP = 20/80 | 0.40 |
| | | | PMMA/PP = 40/60 | 0.88 |
| | | | PMMA/PP = 60/40 | 0.88 |
| Example 10 | PMMA | Acetic acid | PMMA/PS = 60/40 | 0.89 |
| Example 11 | PMMA | Acetic acid | PMMA/PS = 60/40 | 0.93 |
| Example 12 | PA66 | Formic acid | PA66/PP = 40/60 | 0.95 |

TABLE 4

| Matrix PMMA/PP | Amount of carbon black (phr) | PMMA Tg (°C.) | Tg shift (°C.) |
|---|---|---|---|
| 20/80 | 10 | 102 | 4.2 |
|  | — | 97.8 |  |
| 40/60 | 10 | 100 | 4.3 |
|  | — | 95.7 |  |
| 60/40 | 10 | 97.8 | 2.4 |
|  | — | 95.4 |  |
| 100/0 | 10 | 95.1 | 0.9 |
|  | — | 94.2 |  |

Tg and Tg Shift in Example 7 (PMMA/PP system)

As apparent from the results of the foregoing examples, if a mixture of at least two polymers which are incompatible with each other is prepared, and electroconductive filler is predominantly distributed in the polymer having a higher affinity with the filler, an electroconductive polymer composition having a higher conductivity than that obtained by blending each of the polymers as the matrix with the same filler can be obtained. If the solvent extraction method, the differential scanning calorimetric measurement method or the dynamic viscoelasticity measurement method is adopted, to obtain an appropriate mixing ratio, a preferred range of the mixing ratio can be easily determined.

We claim:

1. A process for making an electroconductive shaped article from at least two polymers which are incompatible with each other, such that they do not form a single phase upon mixing, and an electroconductivity-imparting filler which is in the form of at least one of a powder, a flake and a short fiber and is at least one member selected from the group consisting of a carbonaceous filler, a metallic filler, and a filler surface-coated with carbon or metal, which comprises the steps of:

kneading a mixture of the polymers together with 3 to 50% by weight, based on the total weight of the polymers, of the filler to prepare a polymer composition wherein the filler is distributed predominantly in one of the polymers which has a higher affinity for the filler and has a continuous or substantially continuous phase; and shaping the polymer composition into a shaped article, said mixture of the polymers showing crystallization peaks or second-order transitions attributable to the respective mixed polymers when the mixture is subjected to differential scanning calorimetric measurement or dynamic visco-elasticity measurement, and said mixture of polymers having a composition such that the extraction ratio of the polymer having a higher affinity for the filler is at least 0.3, said extraction ratio being expressed by the following formula:

$$\text{extraction ratio} = A/B$$

wherein A is the amount of the polymer having a higher affinity for the filler, which has been extracted from the polymer mixture by a solvent capable of dissolving only the polymer having a higher affinity for the filler, and B is the amount of the polymer having a higher affinity for the filler in the polymer mixture before extraction.

2. The process according to claim 1, wherein the short fiber filler has a diameter of 1 μm or less.

3. The process according to claim 1, wherein the carbonaceous filler is carbon black.

4. The process according to claim 3, wherein the carbon black has a particle diameter of 1 μm or less.

5. The process according to claim 1, wherein the electroconductivity-imparting filler is a vapor grown carbon fiber or a fine short fiber coated with carbon or metal.

* * * * *